United States Patent [19]

Blevens

[11] E Re. 29,404

[45] Reissued Sept. 20, 1977

[54] BRAKING SYSTEM

[75] Inventor: Bertram G. Blevens, Louisville, Ky.

[73] Assignee: The Huffman Manufacturing Company, Miamisburg, Ohio

[21] Appl. No.: 731,564

[22] Filed: Oct. 12, 1976

Related U.S. Patent Documents

Reissue of:

[64] Patent No.: 3,842,946
Issued: Oct. 22, 1974
Appl. No.: 343,890
Filed: Mar. 22, 1973

[51] Int. Cl.[2] ..... B62L 1/12; B62L 3/08

[52] U.S. Cl. ..... 188/24; 188/140 A

[58] Field of Search ..... 188/24, 25, 26, 27, 188/140 R, 140 A, 344, 354, 346, 141, 136, 143

[56] References Cited

U.S. PATENT DOCUMENTS

| | | | |
|---|---|---|---|
| 624,285 | 5/1899 | Zimmerman | 188/140 R |
| 662,602 | 11/1900 | Schmidt et al. | 188/140 R |
| 2,717,662 | 9/1955 | Thompson | 188/27 |
| 2,871,988 | 2/1959 | Wilkerson | 188/26 |

FOREIGN PATENT DOCUMENTS

| | | | |
|---|---|---|---|
| 924,490 | 10/1947 | France | 188/24 |
| 20,846 of | 1892 | United Kingdom | 188/24 |
| 215,386 | 4/1925 | United Kingdom | 188/140 |
| 897,018 | 5/1962 | United Kingdom | 188/26 |

*Primary Examiner*—George E. A. Halvosa
*Attorney, Agent, or Firm*—Biebel, French & Nauman

[57] ABSTRACT

An improved braking system of the caliper type uses only a single hand lever. The operation of one of the caliper type brakes by use of the hand lever in conjunction with the inertia of the vehicle provides energy to supply power for the braking effort to the other caliper brake on the other wheel. This is accomplished by use of a movable mounting [means] for the first brake so that the combination of the movement of the rotating wheel and the brake in engagement with [said] *the* wheel translates these forces into linear motion which is used to apply the braking effort for the other brake at the other wheel.

6 Claims, 3 Drawing Figures

BRAKING SYSTEM

Matter enclosed in heavy brackets [ ] appears in the original patent but forms no part of this reissue specification; matter printed in italics indicates the additions made by reissue.

FIELD OF THE INVENTION

This invention relates to an improved braking system of the caliper type. More specifically, this invention relates to an improved braking system for use on bicycles and powered wheeled vehicles which is capable of applying a braking action at one wheel and to utilize the inertia of the vehicle in combination with the engagement of said brake at that wheel to supply power for the braking effort of the other wheel. The operation of one brake from the other provides an automatic balancing of the two so that each does the proper percentage of the total braking effort. The use of the vehicle inertia to supply power for the braking action permits use of a smaller hand lever which is more easily spanned and is particularly applicable to operation by children. The proper balancing of the braking effort front to rear permits the arranging of linkages so that the front wheel does not and cannot lock up during a panic stop. Further, one hand operation provides simplicity of operation which is extremely important to young riders or to riders of powered vehicles having a number of components such as clutch levers, throttles, etc., requiring simultaneous manual operation. The increased braking efficiency provided by the vehicle inertia permits smaller riders to apply sufficient braking effort with one hand to effectively stop larger vehicles and simultaneously supplies more braking effort for heavier riders since the inertial forces present due to the greater mass automatically develops greater braking effort.

BACKGROUND OF THE INVENTION

Caliper type brakes are introduced into the United States sometime in the late 1950s or early 1960s and provided a much more economical and simplified method of braking than had previously been the practice with the well known coaster brakes. The caliper type brakes, either the conventional or center pull type, however, used hand levers on both handles of the handlebar, one leading to the rear wheel brake and the other to the front wheel brake. This, of course, required a fair amount of coordination, since it was essential, in any event, to apply essentially the same amount of pressure to both brakes at the same time. It was particularly important that the pressure to the front brake not be in excess of the pressure to the rear brake, since this might cause the front wheel to lock and throw the rider over. Because of this and because of the span required by the hand levers, the caliper brakes were not particularly suited for young riders. The safety factors involved in applying the proper amount of pressure to both hand levers simultaneously to prevent front-wheel locking and to achieve the proper amount of braking to stop the vehicle was generally too difficult to inexperienced and young riders. Accordingly, caliper brakes have not been used, for the most part, with beginning riders and for children.

DESCRIPTION OF THE PRIOR ART

According to the prior art, a similar principle has been proposed by Edward D. Wilkerson in U.S. Pat. No. 2,871,988. Wilkerson, in this patent, proposes the use of a crank arm with the conventional coaster brake which would swing through an arc upon application of braking effort to the rear wheel and in so doing transmit motion from a hub mounted brake to a wire or cable connected to a reaction arm of a coaster type brake on the front wheel.

SUMMARY OF THE INVENTION

According to the present invention, the momentum of the vehicle is utilized in transmitting power in the form of linear motion derived through the engagement of a brake engaged with one wheel and mounted on a movable mounting member which in turn is connected to a brake actuating cable or linkage attached to a brake for a second wheel. Since the brake is of the caliper type and is applied to the peripheral portions of the wheel, the amount of energy developed in response to the inertia of the vehicle, and the brake in engagement with the wheel, is extremely significant. The brake actuated through operation of a hand lever and mounted on a movable mounting means engages the rim of the wheel and actually moves with the rotating wheel in the direction of rotation. The power developed thereby is transmitted to apply braking pressure through the brake at the other wheel.

DESCRIPTION OF THE PREFERRED EMBODIMENT

Figure 1:
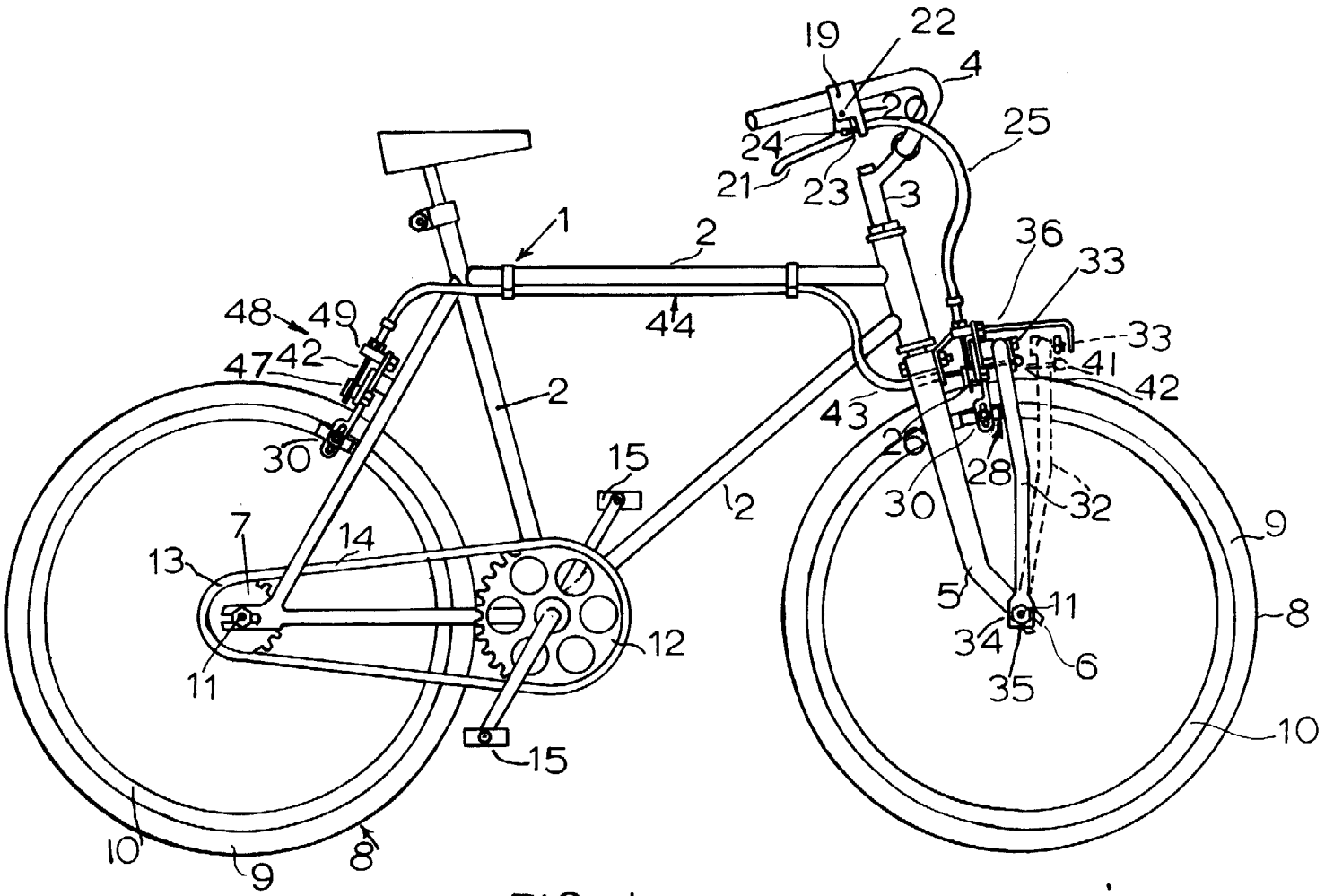
FIG. 1 is a side elevational view of a bicycle, illustrating in full lines the improved braking system of this invention and in dotted lines the braking system in brake actuating position.
Figure 2:
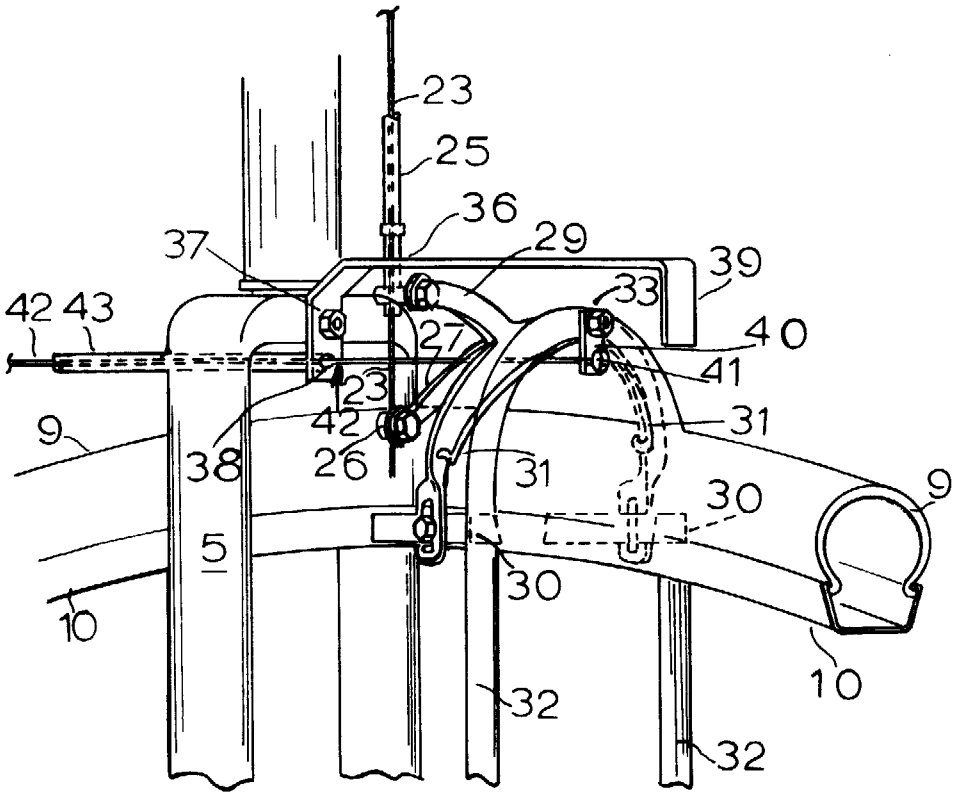
FIG. 2 is a fragmentary view in perspective, illustrating the cable arrangement of the front and rear wheel brakes and the relationship of the movable mounting means of said front wheel brake thereto.

Referring now to the drawings, a bicycle 1 is shown having a frame 2, a steering post 3, and handlebars 4. The front fork 5 of the bicycle terminates in fork ends 6 in which the wheel 8 is journaled through axle 11. The wheels 8 consist of tires 9 and rims 10. The rear wheel is similarly journaled in the rear fork 7 and contains a driven sprocket 13 over which chain 14 is trained to the drive sprocket 12 which is propelled conventionally by pedals 15. As is shown, 19 designates a mounting bracket for the hand brake lever 21. The mounting bracket 19 contains depending flange 20 through which pivot point 22 for the bracket handle for hand brake lever 21 is connected. Wire 23 is connected to the hand brake lever 21 at point 24, while the sheath 25 abuts up against the rear surface of the depending flange 20. The wire 26 is fastened at point 26 to the left-hand lever 27 of the caliper brake 28, while the sheath 25 is connected to the right hand member 29 of the caliper brake 28. The brake shoes 30, as shown, are in position to be engaged with the rim 10 of wheel 8. The left and right hand members 27 and 29 respectively of the caliper brake 28 are held in open position by the legs of spring 31. As will be shown, by reference to FIGS. 1 and 2, the movable mounting means for the front wheel brake 28 is an accessory fork 32 which is flattened at its ends 34 and pivotably connected at point 35 to axle 11. The front wheel caliper brake 28 is mounted on the accessory fork 32 near its bight at pivot point 33 in the form of a bolt which acts as a pivot for the left and right hand members 27 and 29 respectively of caliper brake 28. A safety bracket 36 has a depending leg 37 secured to the main fork 5 of the bicycle, and contains a hole 38 through which the wire 42 of the cable 44 to the rear caliper brake passes and is fastened to the anchor plate 40 connected at the bight of the accessory fork 32 by means of lug 41. The wire 42 as previously described for the front wheel caliper brake 28 is connected to the left hand member 47 of the rear caliper brake 48 whereas the sheath 43 which abuts against the rear surface of the depending leg 37 is connected to the right hand member 49 of the rear caliper brake 48. The brake shoes being identical with the brake shoes of the front wheel caliper brake are denoted by numeral 20. As is shown in full lines in FIG. 1, the accessory fork 32 normally is pulled back by means of the spring in the rear caliper brake (not shown). As the hand lever 21 is actuated and the left and right members 27 and 29 of the front wheel caliper brake 28 are brought into engagement so as to engage brake shoes 30 with the rim 10 of the front wheel, the entire assembly of the accessory fork 32 and the brake with its shoes 30 in engagement with the rim moves forward to the position shown in dotted lines. In so doing the wire 42 secured and anchored by lug 41 in depending anchor plate 40 pulls forward to actuate the left hand member 47 of the caliper brake 48, and the sheath 43 in abutment with the depending leg 37 reacts to the movement of wire 42 to push against the right hand member 49 of caliper brake 48 to bring the brake shoes 30 into engagement with rim 10 of the rear wheel. Since the braking force available is proportional to the length of the legs of the accessory fork 32 and to the mass of the bicycle and rider, the braking pressure applied to the rear wheel is automatically compensated for differing conditions, and through proper linkage arrangement can be properly balanced for all situations. Since less braking effort is required by the rider than with the use of the double handled members, it is not necessary to apply simultaneously exact equivalent pressure to both hand levers. The possibility of a front wheel lock-up in a panic stop is almost completely eliminated. Further, for use with powered vehicles such as motor bikes and motorcycles, where it is essential to manipulate other hand levers simultaneously with the application of the brake, the use of a single hand lever for braking simplifies the operation and accounts for less chance of error.

Figure 3:
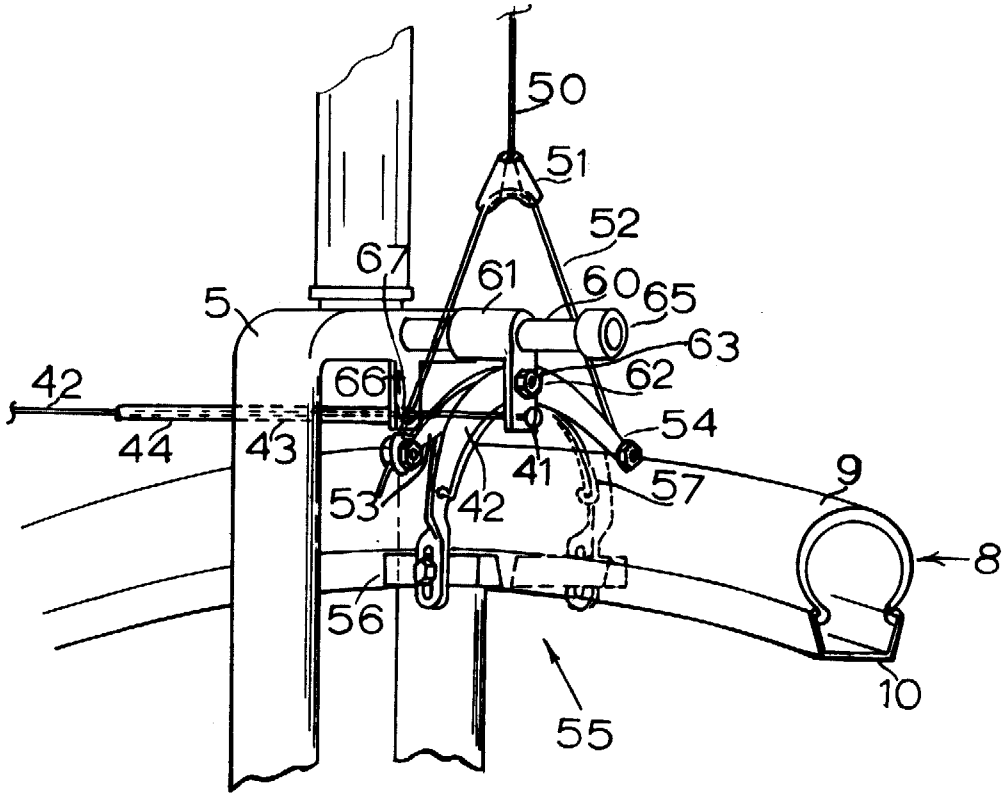
FIG. 3 is a fragmentary view in perspective, illustrating a modification of the movable mounting means for said first brake member and the application of a center pull cable to said first brake member.

Referring now to FIG. 3, a modification of the caliper brake and of the mounting means is shown. In this modification, rather than the conventional caliper brake cable arrangement the center pull arrangement is shown wherein the wire 50 depends from the hand lever 21 onto stirrup 51. A wire 52 trained through the two depending legs of stirrup 51 is connected to the left hand member 53 and to the right hand member 54 of the caliper brake 55. These members 53 and 54 operate brake shoes 56 against the rim 10 of wheel 8. Spring 57 acts to keep members 53 and 54 open. A post 60 is fixedly secured near the bight of the front wheel fork 5, and a depending plate 66 depends from the point of attachment. A sleeve, 61, is slidably mounted on the post and the sleeve 61 contains a depending mounting plate 62 through which a bolt is extended to serve as a pivot point 63 for the left hand member 53 and the right hand member 54 of the caliper brake 55. A retaining collar 65 is at the end of the post 60 to limit the sliding movement of the sleeve 61 along this post. The depending plate 66 contains a hole 67 for wire 42, and the reverse side of the plate serves as an abutment means for the sheath 43 of the cable 44 going to the rear caliper brake. Again, the wire 42 is secured to the mounting plate 62 by means of lug 41, and the entire mounting mechanism comprising the sleeve 61 and depending plate 62 slides along the post 60 and therefore applies braking pressure through the cable 44 to the rear caliper brake in the method previously indicated.

Many modifications will occur to those skilled in the art from the detailed description hereinabove given, and such description is meant to be exemplary in nature and non-limiting in scope except so as to be commensurate in scope with the appended claims.

I claim:

1. For use with a bicycle, including a frame and wheel forks, wheels rotatably mounted in said wheel forks and means for imparting rotation to said wheels for propelling the bicycle, the combination therewith of an improved braking system, which comprises:

A. brakes mounted near the periphery of each of said wheels for application of braking effort to the peripheral portion of each of said wheels:

B. means for applying effort to a first brake:

C. the improvement of motion transmission means for translating vehicular momentum to linear movement for application of effort to the other of said brakes, comprising:

1. a movable mounting means for said first brake;

a. said mounting means comprising a sliding mechanism including:

1. a supporting structure for said sliding mechanism *having an elongated portion which extends transverse to the axis of rotation of a first one of said wheels* fixedly mounted to the frame of said bicycle *adjacent said first one of said wheels thereof*, and, 2. a mounting member slidably mounted thereon, said mounting member being movable *only* in the direction *along said elongated portion transverse to the axis* of rotation of said *first one of said* wheels in response to the motion of said *first one of said* wheels and the braking effort of the brake in engagement [with one of said wheels] *therewith*;

3. the further improvement in which said supporting structure is a post and said mounting member is a sleeve slidably mounted thereon, and;

2. linkage means in operative relation with said movable mounting member and said other brake for transmitting motion from said movable mounting member to said other brake and for application of brake engaging effort to said other brake.

2. The improved braking system, as defined in claim 1, the further improvement of a retaining collar on the end of said post for limiting the linear movement of said sleeve.

*3. In combination with a bicycle including a bicycle frame and wheel forks, front and rear wheels rotatably*

*mounted in said wheel forks for rotation about their respective axes and means for imparting rotation to said wheels for propelling said bicycle, and improved braking system comprising:*

*caliper type brakes mounted adjacent the periphery of said wheels and each including opposed brake shoes positioned adjacent opposite sides of the wheel with which said brake is associated for the application of braking effort thereto,*

*first cable means for operating a first one of said caliper type brakes to cause said opposed brake shoes thereof to move into frictional engagement with said opposite sides of the wheel with which said first one of said caliper brakes is associated,*

*a first, fixed slide member having an elongated portion which extends transverse to the axis of rotation of a first one of said wheels mounted on said bicycle frame and projecting outwardly therefrom,*

*a second, movable slide member,*

*said fixed and movable slide members being interengaged such that movement of said movable slide member is substantially restricted in all directions except transversely to the axis of the wheel with which said first one of said caliper brakes is associated while permitting only limited sliding movement of said movable slide member along said elongated portion in the direction transverse to said axis of said wheel with which said first one of said caliper brakes is associated,*

*means mounting said first one of said caliper type brakes on said second, movable slide member for movement therewith,*

*second cable means extending from adjacent said first one of said caliper type brakes to a second one of said caliper type brakes,*

*means fixing a first end of said second cable means with respect to said movable slide member for movement therewith, and*

*means attaching an opposite end of said second cable means to said second one of said caliper type brakes for actuating said second one of said caliper type brakes in response to sliding movement of said movable slide member in only said direction transverse to said wheel axis.*

*4. The combination of claim 3 wherein:*

*said fixed and movable slide members comprise a post and a collar encircling said post for relative sliding movement therebetween.*

*5. For use with a bicycle, including a frame and wheel forks, front and rear wheels rotatably mounted in said wheel forks for rotation about their respective axes and means for imparting rotation to said wheels for propelling the bicycle, the combination therewith of an improved braking system, which comprises:*

*caliper type brakes mounted near the periphery of said wheels, each of said caliper type brakes including a pair of brake levers carrying opposed brake shoes positioned adjacent opposite sides of the wheel with which said brake is associated for application of braking effort thereto,*

*a movable accessory fork having a pair of legs disposed on opposite sides of the wheel with which a first one of said caliper type brakes is associated and a bight position rigidly interconnecting outer ends of said legs outwardly of said periphery of the wheel with which said first one of said caliper type brakes is associated,*

*said legs of said accessory fork being substantially rigid in the direction of the axis of the wheel disposed between said legs,*

*means mounting said first one of said caliper type brakes on said bight of said accessory fork for movement therewith,*

*said accessory fork forming the primary supporting means for said first one of said caliper type brakes,*

*means pivotally attaching inner ends of said accessory fork legs adjacent the axis of rotation of the wheel with which said first one of said caliper type brakes is associated,*

*means for applying braking effort to said first one of said caliper type brakes by relative movement of said brake levers, bringing said brake shoes thereof into frictional engagement with said opposite sides of said wheel with which they are associated,*

*actuating cable means including sheath and wire means with said wire means slidably received in said sheath means and projecting from opposite ends thereof,*

*said actuating cable means extending from adjacent said first one of said caliper type brakes to adjacent a second one of said caliper type brakes,*

*means attaching one end of said sheath means to said frame adjacent said first one of said caliper type brakes,*

*means attaching one end of said wire means to said accessory fork adjacent said bight thereof, and*

*means attaching ends of said sheath and wire means opposite said one end of each in operative association with said levers of said second one of said caliper type brakes;*

*whereby application of braking effort by said first one of said caliper type brakes will cause said accessory fork to pivot about said inner ends of said legs thereof, shifting said wire means longitudinally of said sheath means and bringing the brake shoes carried by the levers of said second one of said caliper type brakes into frictional engagement with opposite sides of the wheel with which said second one of said caliper type brakes is associated.*

*6. The system of claim 5 wherein:*

*said means attaching said opposite ends of said sheath and wire means in operative association with said levers of said one of said caliper type brakes includes means attaching said opposite end of said sheath means and said opposite end of said wire means directly to said levers, respectively, of said second one of said caliper type brakes.*

* * * * *